US010107395B2

(12) United States Patent
Pritts et al.

(10) Patent No.: US 10,107,395 B2
(45) Date of Patent: Oct. 23, 2018

(54) TRANSMISSION SHIFT FORK

(71) Applicant: RB Distribution, Inc., Colmar, PA (US)

(72) Inventors: Jeffrey D. Pritts, Lansdale, PA (US); Steven William Butcher, Collegeville, PA (US)

(73) Assignee: RB Distribution, Inc., Colmar, PA (US)

( * ) Notice: Subject to any disclaimer, the term of this patent is extended or adjusted under 35 U.S.C. 154(b) by 326 days.

(21) Appl. No.: 14/922,588

(22) Filed: Oct. 26, 2015

(65) Prior Publication Data

US 2017/0114896 A1     Apr. 27, 2017

(51) Int. Cl.
*F16H 63/32*     (2006.01)

(52) U.S. Cl.
CPC ..................... *F16H 63/32* (2013.01)

(58) Field of Classification Search
CPC ................... F16H 63/32; F16H 63/00
See application file for complete search history.

(56) References Cited

U.S. PATENT DOCUMENTS

| | | | | |
|---|---|---|---|---|
| 4,495,831 A * | 1/1985 | Takahashi | ............... | F16H 63/32 192/113.5 |
| 4,529,080 A | 7/1985 | Dolan | | |
| 5,201,237 A | 4/1993 | Berndtson | | |
| 5,573,096 A * | 11/1996 | Erlebach | ............... | B60K 23/02 192/110 R |
| 6,450,057 B1 * | 9/2002 | Winkler | ................. | F16H 63/30 74/473.1 |
| 6,619,153 B2 * | 9/2003 | Smith | ..................... | F16H 63/32 74/337.5 |
| 7,441,477 B2 * | 10/2008 | Ho | .......................... | F16H 63/32 74/473.36 |
| 7,617,899 B1 * | 11/2009 | Warner | ................. | B62M 27/02 180/190 |
| 8,037,780 B2 * | 10/2011 | Caenazzo | ............... | F16H 63/30 74/473.36 |
| 8,397,599 B2 * | 3/2013 | Ungerathen | ............ | F16H 63/32 74/473.36 |
| 8,413,537 B2 * | 4/2013 | Garabello | ............... | F16H 63/30 74/473.36 |
| 8,627,739 B2 * | 1/2014 | Tooman | .............. | F16H 63/3023 74/473.36 |
| 9,097,339 B2 * | 8/2015 | Skogward | ............... | F16H 63/32 |
| D790,416 S * | 6/2017 | Pritts | ....................... | F16H 63/32 D12/179 |

OTHER PUBLICATIONS

Photographs of a prior art design, pp. 1-7, known to the Inventors.

* cited by examiner

*Primary Examiner* — David M Fenstermacher
(74) *Attorney, Agent, or Firm* — Volpe and Koenig, P.C.

(57) ABSTRACT

The disclosed transmission shift fork has improved contact areas that engage a gear that is shifted into and out of engagement with the drive train. As a result of the improved contact areas the gear and the shift fork have a more stable alignment that reduces wear during shifting and avoids uneven wear of the parts. The shift fork has an elongated pin that is positioned inside of a biasing spring. The pin has a length that is greater than the length of a compressed biasing spring, which contributes to increased stability and reduced wear from linear movement.

20 Claims, 7 Drawing Sheets

TRANSMISSION SHIFT FORK

FIELD OF INVENTION

The present invention relates generally to distributing power from the engine through the drive train to the vehicle's wheels. More particularly, the invention relates to movable shift forks that are located in the drive train to enable an operator to select different drive train configurations. Most particularly, the invention relates to shift forks associated with the selection between two and four wheel drive.

BACKGROUND

Transmission shift forks have been common in transmissions and drive trains for some time. More recently, vehicles that can selectively be shifted between drive trains that engage two or four wheel drive are becoming increasingly popular. In many applications, the shift fork is the part of the drive assembly that is moved to engage or disengage a coupling between an input gear and an output gear. When the vehicle is in two wheel drive, the shift fork is positioned for disengagement and, conversely, when the shift fork is positioned for engagement the vehicle is in four wheel drive.

Known prior art shift forks of the type this invention concerns have suffered from two deficiencies. One deficiency has been wear on the fork or the surfaces OF THE dependent arm due to the continuous contact between the fork and the spinning coupling gear that is shifted by the fork. Another problem area has been wear and breakage of the fork's pilot pin which guides linear movement of the fork.

With respect to the first deficiency, there have been attempts to add wear pads to the surfaces of the fork that contact the gear flanges that define the outer edges of the race within which the fork rest when it engages the gear. However, this attempt has not been successful as did not alleviate the misalignment between the fork and the gear. This misalignment ultimately led to wear on the shaft or pin on which the fork rest for liner movement to effect the desired engagement. With respect to the defect in the shaft or pin, the inventors are not aware of any prior art attempt to address this problem.

The objects of the present invention are to provide a shift fork with improved pilot pin and contact wear surfaces.

SUMMARY

The present solution provides a shift fork with improved contact areas for engaging the gear that is shifted into and out of engagement. As a result of the improved contact areas the gear and the shift fork have a more stable horizontal alignment that reduces wear and avoids uneven wear of the parts. In addition to the improved contact areas, the shift fork also has an elongated pin that is positioned inside of a biasing spring and has a length that is greater than the length of the biasing spring when it is in a compressed condition.

BRIEF DESCRIPTION OF THE DRAWING(S)

DETAILED DESCRIPTION OF THE PREFERRED EMBODIMENT(S)

Figure 1:
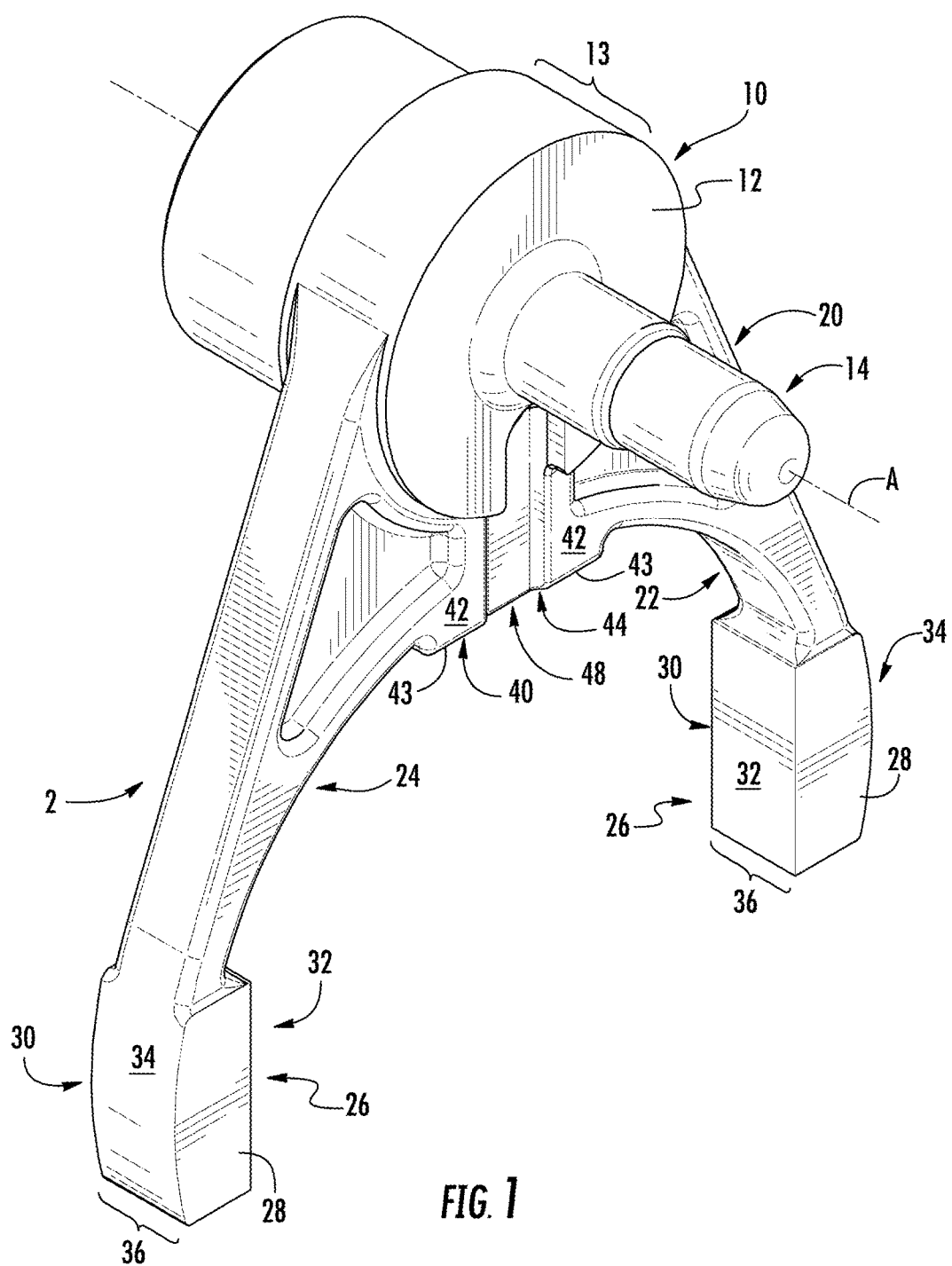
FIG. 1 is a perspective view of the shift fork according to the invention.

With reference to the perspective view of one side of the shift fork in FIG. 1, the shift fork 2 has a hub 10 that includes face 12, midsection 13, and a pilot pin or shaft 14 that is generally perpendicular to and centered on the horizontal face 12. The shaft 14 extends along the longitudinal axis "A." Depending from the midsection 13 is a torso 20 with dependent arms 22 and 24. The arms 22 and 24 extend outwardly from the torso 20 in an arched or semi-circular fashion that defines an interior opening between them. Each arm has a free end that terminates in a contact portion or wear pad 26. The wear pads 26 have parallel faces 28 and 30, see FIGS. 1 and 2, a planar inner face 32 that extends between faces 28 and 30 and is perpendicular to them. The outer face 34 of the wear pads 26 extends between faces 28 and 30 and is somewhat arcuate. The With reference to FIGS. 1 and 2, the torso 20 has a central wear pad 40. The wear pad 40 has different faces on either side of the torso 20. On the side of torso 20 with the shaft 14, the wear pad 40 has two parts 42 on either side of a lubrication channel that extends from the surfaces 43 into the face 12 just beneath the shaft 14. The lower faces 43 of the parts 42 are in the same plane 44 as the rest of the wear pad 40. On the opposite side of torso 20, there is a wear pad 46 with a continuous surface, see FIG. 2. The wear pads 26 and 40 have a width 36 that is selected to complement the transfer gear as is explained later.

Figure 2:
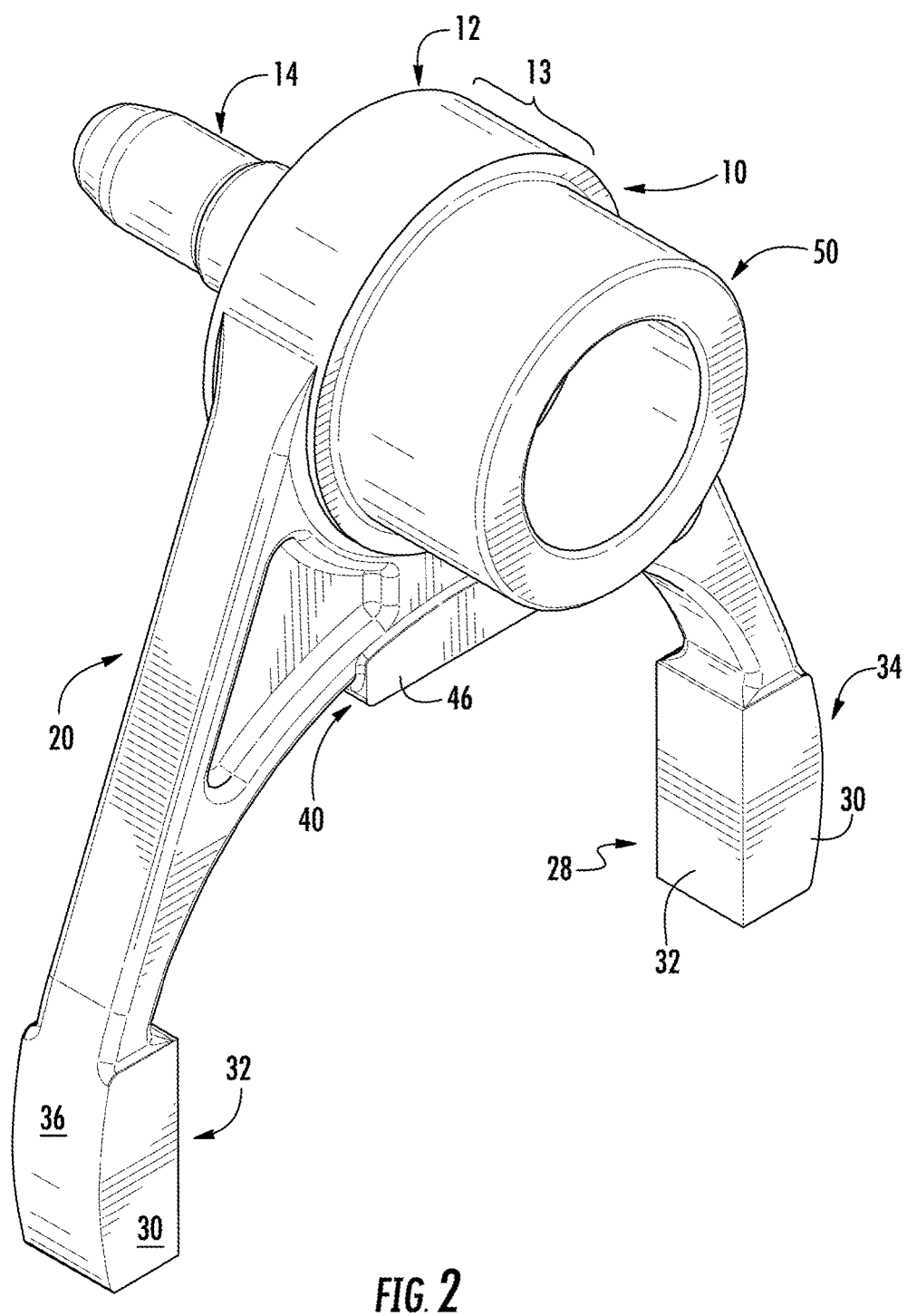
FIG. 2 is a perspective view of the shift fork of FIG. 1 form the other side.

Also with reference to the side shown in FIG. 2, there is a tubular projection 50 which is configured in accordance with an original equipment shift fork so it fits the pre-existing environment.

Figure 3:
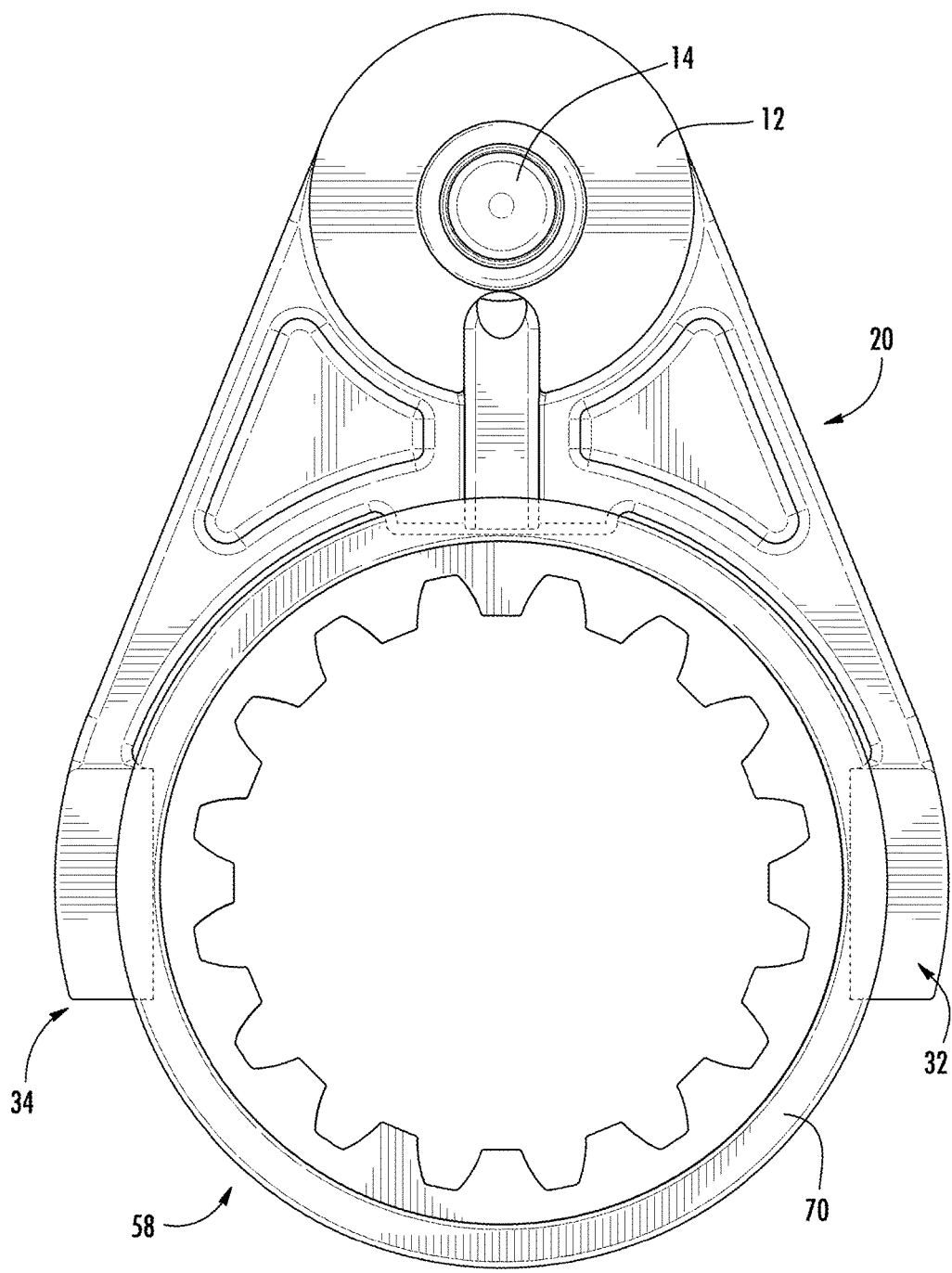
FIG. 3 is a plan view of the shift fork in engagement with a shift gear.
Figure 5:
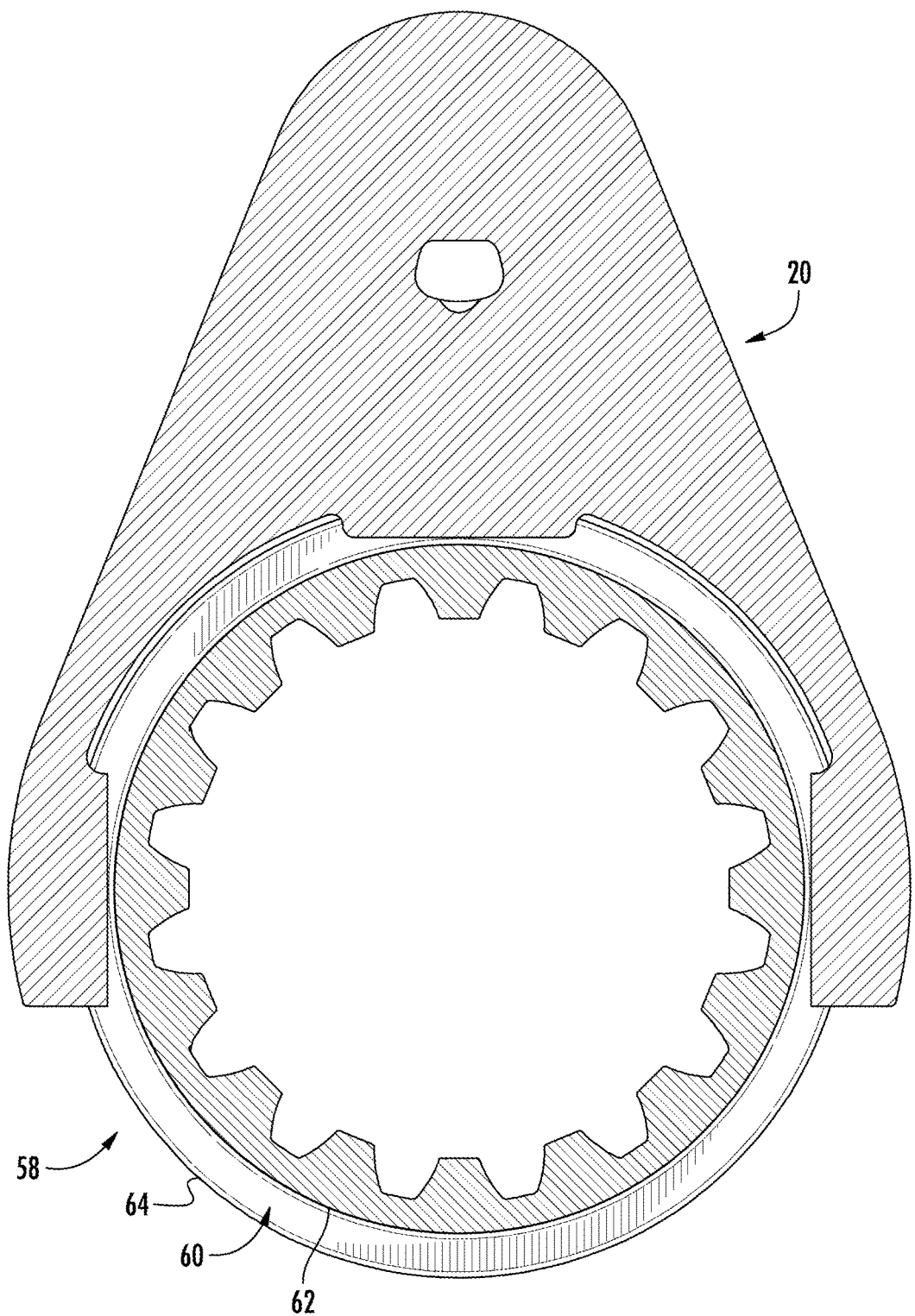
FIG. 5 is a section along the line 5-5 in FIG. 4.

With reference to FIGS. 3 and 5, there is illustrated a combination of the present shift fork 10 with an existing transfer gear 58. The wear pads 26 and 40 have planar surfaces, 32 and 44 respectively, that form tangents to the inner circumference 62 of a circumferential channel 60 having an outer circumference 64. The circumferential channel 60 has outer walls 70 that define a predetermined width to the channel 60. The width of the channel 60 associated with a given transfer gear will determine the width 36 of the wear pads 26 and 40. The channel and wear pads are dimensioned so that lubricant flows between them and the gear rotates freely; however, it will be understood that this is a close tolerance that just accommodates the viscosity of the lubricant in the transmission case.

Figure 4:
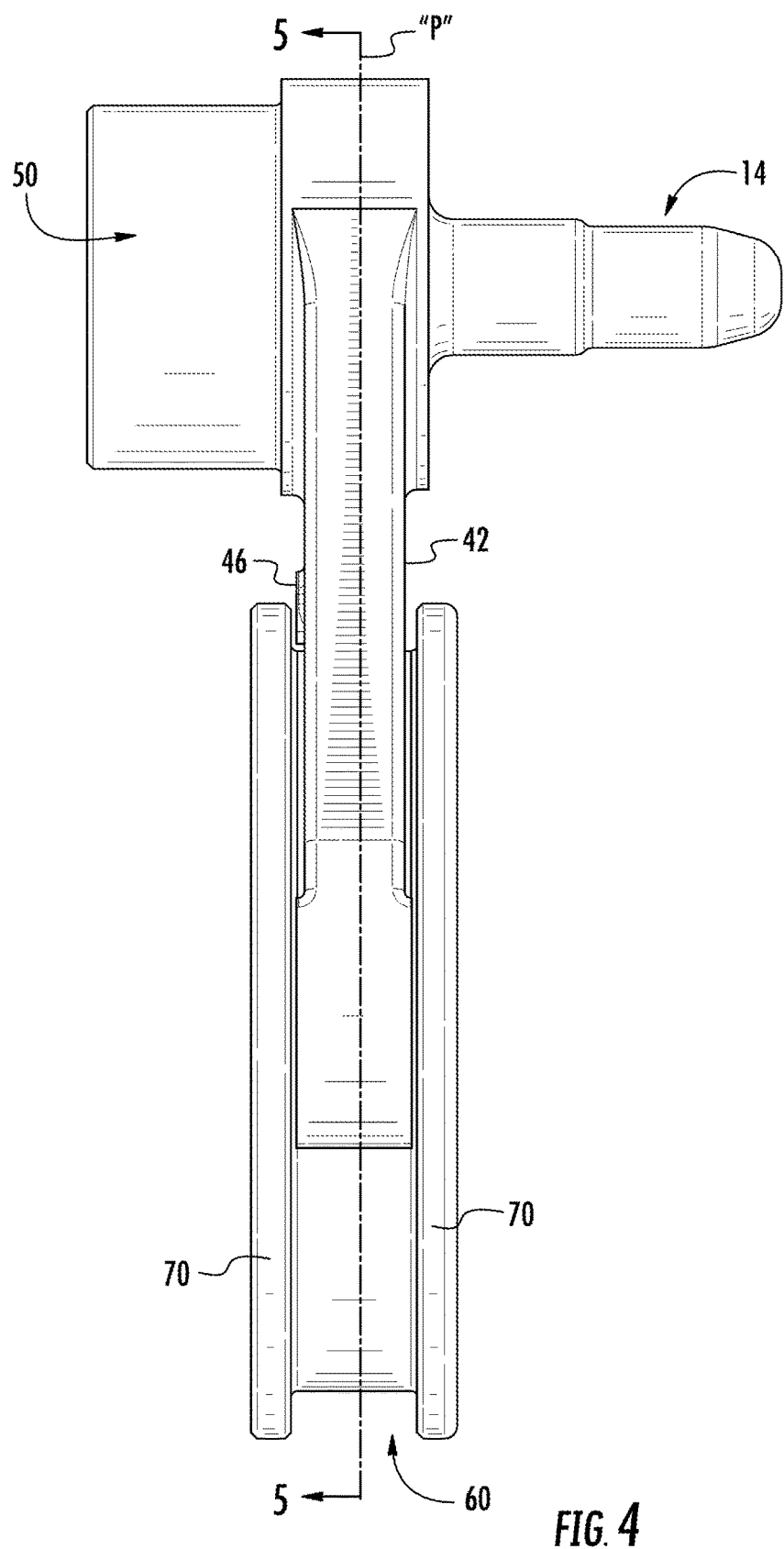
FIG. 4 is a side elevation of an engaged shift fork and shift gear.

With reference to FIG. 4, there is a side view of combination of FIG. 3. It can be seen from FIG. 4 that the fit between the wear pads, 26 and 40, with the channel, 60, of the transfer gear, 58, maintains hub 10, torso 20, arms 22 and 24 and transfer gear 58 centered about a common plane, "P", that is perpendicular to longitudinal axis "A".

Figure 6:
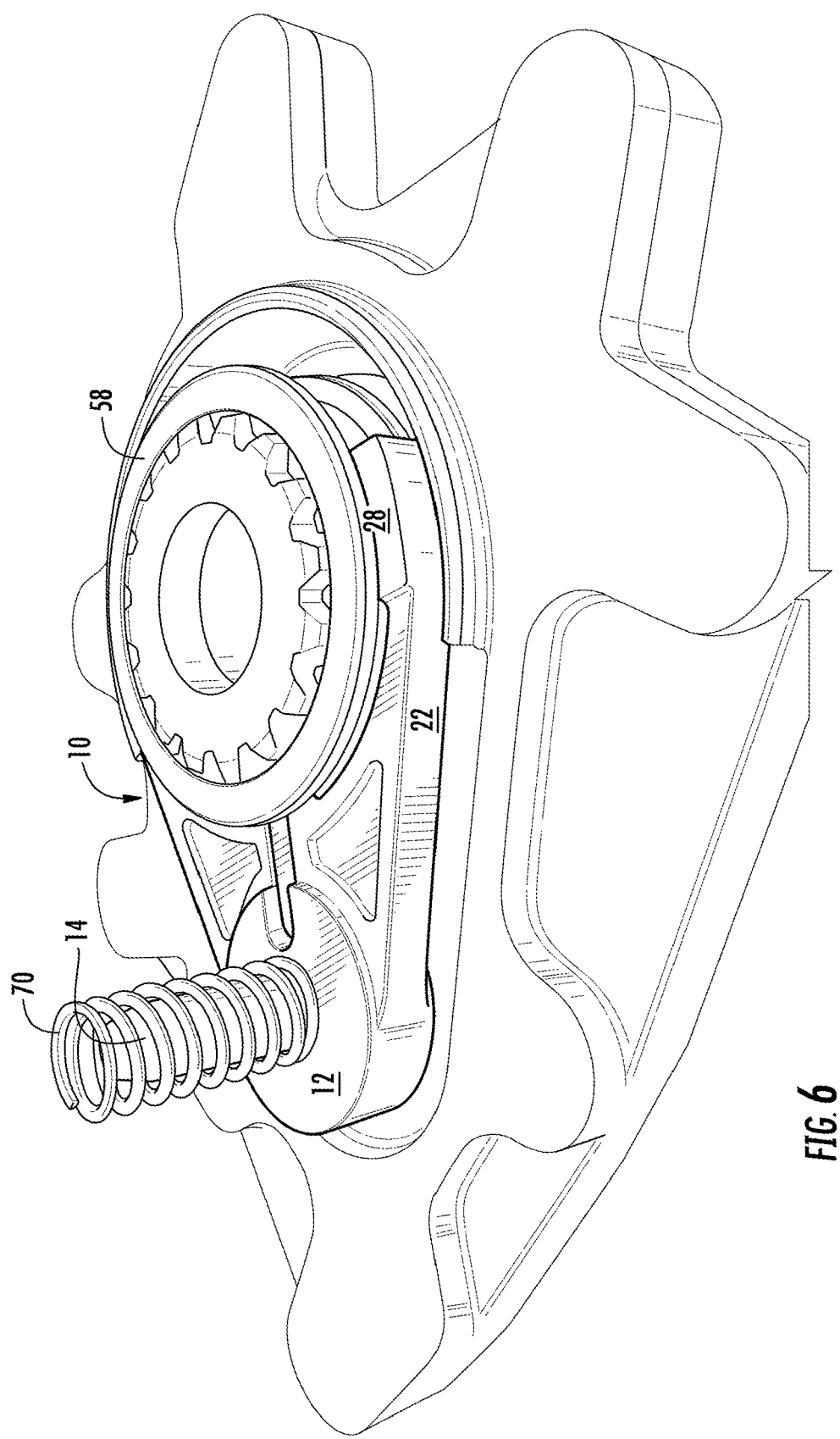
FIG. 6 is an illustration of the gear and a shift fork according to the invention in a transfer case with a biasing spring positioned about the pin of the shift fork.

FIG. 6 illustrates the combination of a shift fork, 10, according to the present invention and a transfer gear, 58, in fragmentary transmission housing. When the fork 10 is located within the transmission housing, it is surrounded by a compression spring 70. As shown in FIG. 6, the compression spring is in a relaxed state. When the shift fork 10 is moved linearly to a condition where the spring 70 is compressed, the pin 14 extends beyond the beyond the end of the compressed spring. This relationship between the pin and spring in the compressed state differs from the prior art because the prior art pin does not extend beyond the end of the compressed spring, but the current pilot pin 14 is provided with a greater length. This increased length means that the present pilot pin 14 extends beyond the compressed spring and stabilizes the pin 14 during linear movement. This additional stability combines with the existing tubular projection 50 to maintain a centralized orientation about common plan "P" see FIG. 4. This centralized orientation reduces known prior art problem of the shift fork slanting and contributing to misalignment problems.

Figure 7:
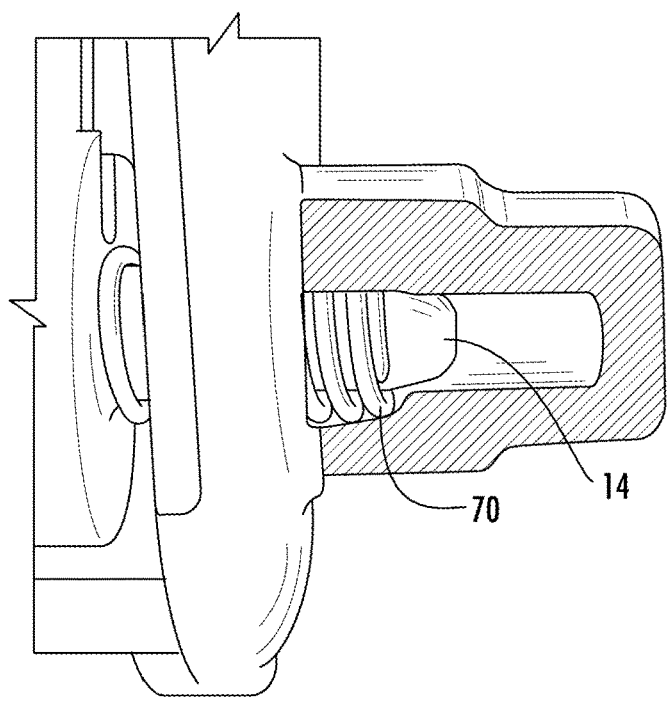
FIG. 7 illustrates the relationship between the pin and biasing spring of the invention during compression within a transfer case; and, FIG. 8 illustrates the relationship between the pin and the biasing spring of the prior art during compression within a transfer case.
Figure 8:
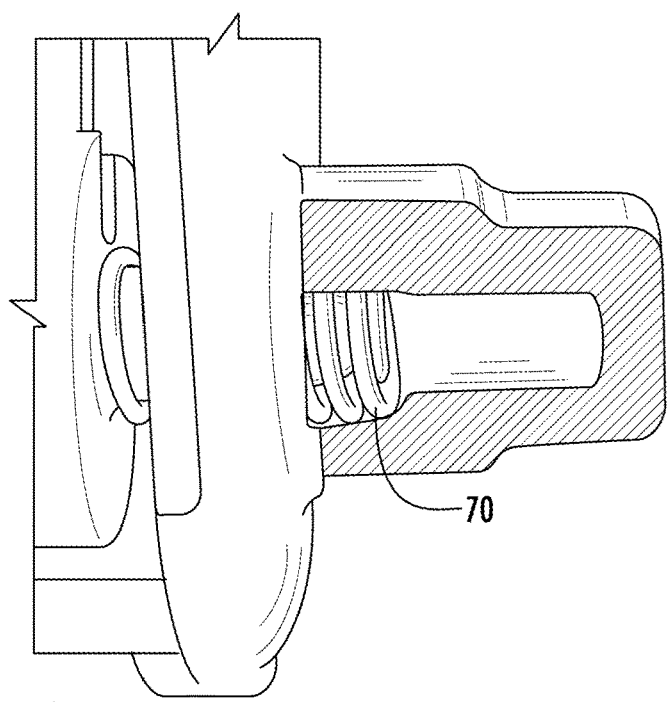

FIG. 7 is a fragmentary illustration of the pin and compressed spring of the present invention in a transmission housing and FIG. 8 is a fragmentary illustration of a prior art pin and compressed spring in transmission housing.

What is claimed is:

1. A vehicle transmission shift fork for engaging a transfer gear, the shift fork is a unified structure comprising:
   a hub that has a midsection and dependent arms centered about a common plane, first face that includes a tubular projection that extends away from the first face, and a second face opposite the first face that includes a shaft projecting away from the second face;
   the dependent arms defines an interior cavity of a predetermined diameter that complements an interior diameter associated with a circumferential channel encircling a predetermined transfer gear, each dependent arm has an end contact portion of a predetermined size that is complementary to the circumferential channel; and,
   a combination of the complementary fit between the contact portions and a predetermined transfer gear's circumferential channel maintains the hub midsection and the dependent arms centered about the common plane.

2. The shift fork of claim 1 wherein the tubular projection and the shaft that are aligned along a longitudinal axis.

3. The shift fork of claim 2 wherein the longitudinal axis is perpendicular to the common plane about which the hub midsection and the dependent arms are centered.

4. The shift fork of claim 1 wherein the end portions of the dependent arms include wear pads.

5. The shift fork of claim 4 wherein the wear pads have parallel outer faces that are separated by an inner face.

6. The shift fork of claim 5 wherein the inner face is perpendicular to the parallel outer faces.

7. The shift fork of claim 5 wherein the parallel outer faces that are separated by a distance that is substantially equal to a width associated with the circumferential channel encircling a predetermined transfer gear.

8. The shift fork of claim 7 wherein the inner face of the end portions are spaced apart by a distance substantially equal to the predetermined diameter that complements an interior diameter associated with the circumferential channel encircling a predetermined transfer gear.

9. The shift fork of claim 8 wherein the hub has a central wear pad located between the dependent arms, the central wear pad having parallel outer faces that are separated by the distance that is substantially equal to a width associated with the circumferential channel encircling a predetermined transfer gear.

10. The shift fork of claim 1 further comprising a compression spring with a compressed length that is less than a predetermined length of the shaft.

11. The shift fork of claim 10 wherein the end portions of the dependent arms include wear pads that have parallel outer faces that are separated by an inner face.

12. The shift fork of claim 11 wherein the inner face is perpendicular to the parallel outer faces.

13. The shift fork of claim 12 wherein the parallel outer faces that are separated by a distance that is substantially equal to a width associated with the circumferential channel encircling a predetermined transfer gear.

14. The shift fork of claim 13 wherein the inner face of the end portions are spaced apart by a distance substantially equal to the predetermined diameter that complements an interior diameter associated with the circumferential channel encircling a predetermined transfer gear.

15. The shift fork of claim 10 wherein the compression spring surrounds a proximal end of the shaft.

16. The shift fork of claim 1 wherein the tubular projection and the shaft extend along a common longitudinal axis.

17. The shift fork of claim 1 wherein the hub has a central wear pad with located between the dependent arms.

18. The shift fork of claim 17 wherein central wear pad is beneath the second face and has a a lubrication channel that extends into the second face.

19. A vehicle transmission shift fork for engaging a transfer gear, the shift fork comprising:
   a hub that includes a face with an integrally formed shaft that extends along a longitudinal axis that is perpendicular to the hub face;
   a midsection that is joined to the hub and combines with dependent arms to form an arched cavity;
   a central wear pad located in the arched cavity between the dependent arms; and
   each of the dependent arms has an end portion with a wear pad that is sized to fit within a predetermined bearing collar channel that is defined by a circular base and opposed circular flanges that are spaced apart by the base; the central wear pad and each wear pad of the dependent arms has first and second opposed faces that contact the circular flanges and inner face that contacts the circular base.

20. A vehicle transmission shift fork for engaging a transfer gear, the shift fork comprising:
   a transfer gear including a circumferential channel encircling the transfer gear;
   a hub with a midsection that supports dependent arms that define an interior cavity with a predetermined diameter that complements the circumferential channel encircling the transfer gear, and the hub midsection and dependent arms are centered about a common plane;
   the hub further supports a central wear pad that is centered about the common plane, the central wear pad having a contact portion of a predetermined size that is complementary to a portion of the circumferential channel;
   each dependent arm has a free end with a contact portion of a predetermined size that is complementary to a portion of the circumferential channel; and,
   wherein a combination of the contact portions and the circumferential channel maintains the shift fork and transfer gear centered about the common plane.

* * * * *